(12) United States Patent
Kaas et al.

(10) Patent No.: US 8,498,760 B2
(45) Date of Patent: Jul. 30, 2013

(54) SYSTEM AND METHOD FOR SIMULTANEOUSLY PROCESSING TELEMETRY DATA

(75) Inventors: Gerald E. Kaas, Castle Rock, CO (US); Derek L. Bassett, Aurora, CO (US)

(73) Assignee: Raytheon Company, Waltham, MA (US)

( * ) Notice: Subject to any disclaimer, the term of this patent is extended or adjusted under 35 U.S.C. 154(b) by 1635 days.

(21) Appl. No.: 11/965,503

(22) Filed: Dec. 27, 2007

(65) Prior Publication Data

US 2010/0049381 A1 Feb. 25, 2010

(51) Int. Cl.
*B64G 1/10* (2006.01)
*G06F 17/00* (2006.01)
*G06F 17/12* (2006.01)
*G01C 21/00* (2006.01)
*G01C 21/24* (2006.01)

(52) U.S. Cl.
USPC ............. 701/13; 701/412; 701/519; 701/531; 342/355; 342/357.21

(58) Field of Classification Search
USPC ............... 701/1–4, 13, 14, 33, 35, 11, 23, 24, 701/116, 400, 408, 412, 468, 469, 484, 485, 701/517, 518, 519, 520, 531; 342/352, 355, 342/357.01, 357.02, 357.03, 357.04, 378, 342/357.2, 357.21, 357.22, 357.39, 357.395; 455/12.1, 13.2; 340/3.1, 3.3, 3.42, 3.43, 3.44, 340/870.01
See application file for complete search history.

(56) References Cited

U.S. PATENT DOCUMENTS

| 6,813,596 B2* | 11/2004 | Ellis et al. ..................... 703/8 |
| 2004/0043725 A1* | 3/2004 | Satoh ......................... 455/11.1 |
| 2008/0082222 A1* | 4/2008 | Kim et al. ....................... 701/3 |

* cited by examiner

*Primary Examiner* — Thomas Tarcza
*Assistant Examiner* — Edward Pipala
(74) *Attorney, Agent, or Firm* — Cantor Colburn LLP

(57) ABSTRACT

According to one embodiment of the disclosure, a method for use in telemetry processing includes receiving telemetry data originating from a satellite, such that the telemetry data comprises a plurality of data segments. The method includes processing the plurality of data segments simultaneously and transmitting a signal to the satellite, in response to the processing, for effecting a change in the direction of the satellite.

20 Claims, 2 Drawing Sheets

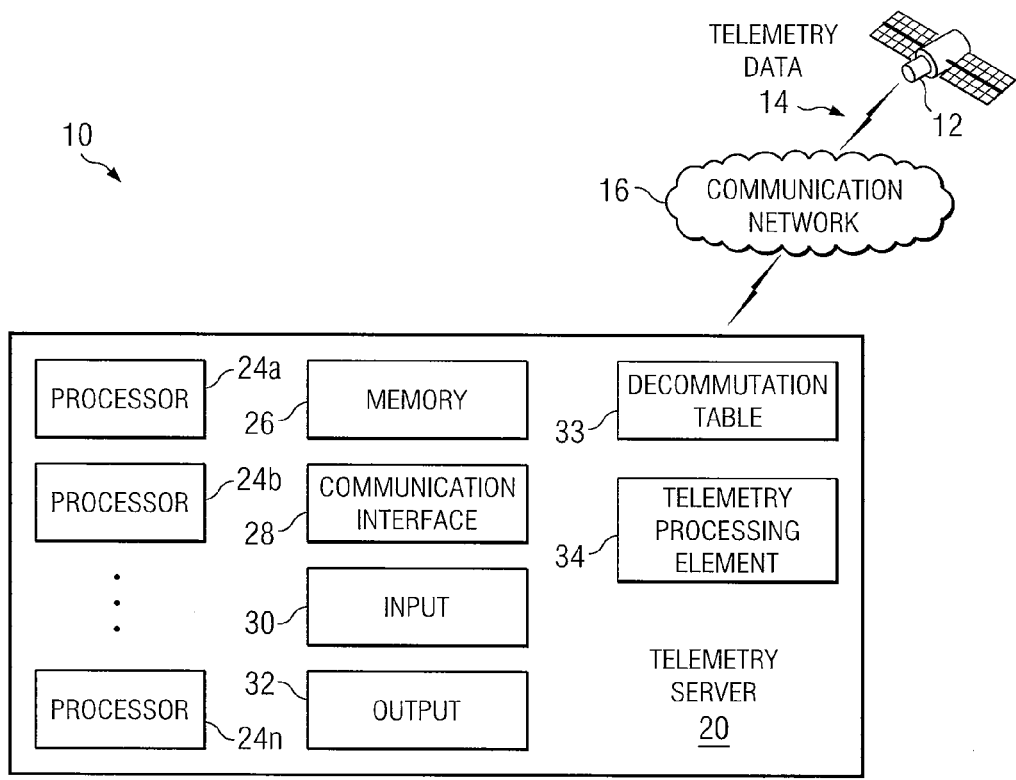
*FIG. 1A*
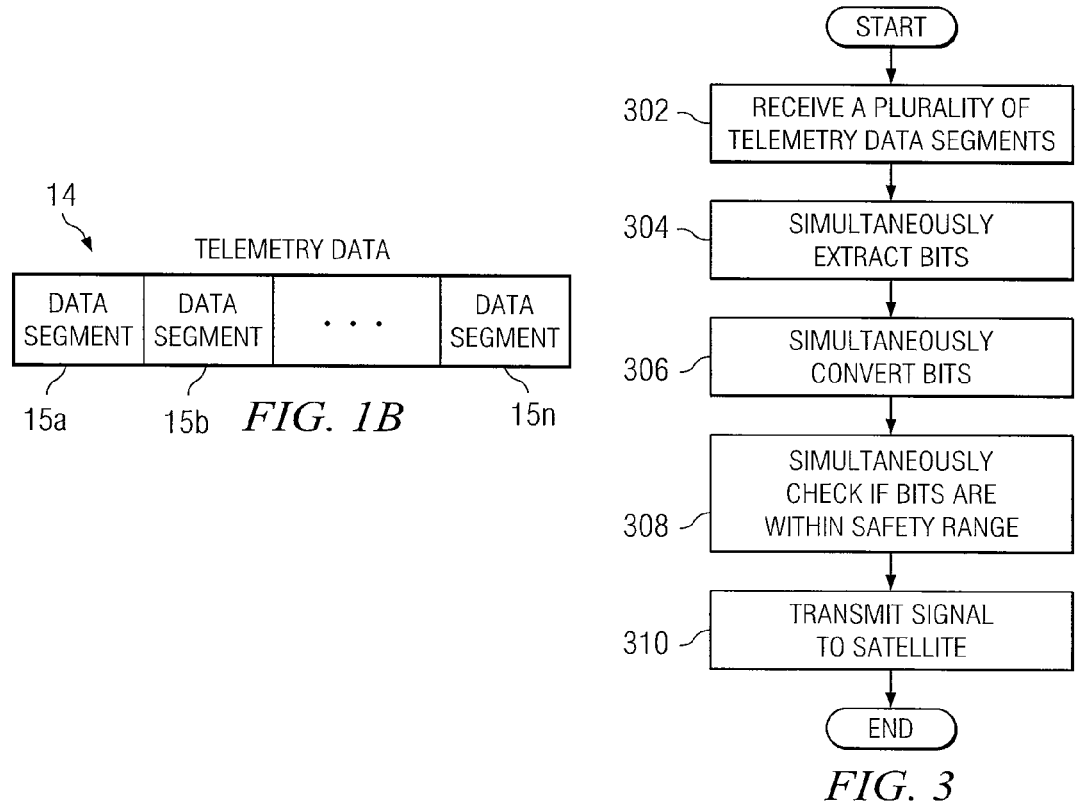
*FIG. 1B*
*FIG. 3*

SYSTEM AND METHOD FOR SIMULTANEOUSLY PROCESSING TELEMETRY DATA

TECHNICAL FIELD

This disclosure relates in general to satellite systems, and more particularly, to a system and method for simultaneously processing telemetry data.

OVERVIEW

Telemetry processing generally includes receiving telemetry data from a satellite, processing the telemetry data, and sending a signal to the satellite in response to the processing results. It is important for a telemetry engine to process telemetry data as fast as possible to timely send a signal to the satellite in response to the results of the telemetry processing. As the technology for transmitting data from satellites increases, methods for quickly processing telemetry data become even more critical for timely sending a signal to the satellite in response to the processed telemetry data. Thus, the ability to efficiently and quickly process telemetry data being received at higher data rates presents a significant challenge to system designers of telemetry engines.

SUMMARY

According to one embodiment, a method for use in telemetry processing includes receiving telemetry data originating from a satellite, such that the telemetry data comprises a plurality of data segments. The method includes processing the plurality of data segments simultaneously and transmitting a signal to the satellite, in response to the processing, for effecting a change in the direction of the satellite.

In an embodiment, the processing of the plurality of data segments simultaneously may include processing a first selected data segment on a first selected thread from a plurality of threads, and processing a second selected data segment on a second selected thread, such that the processing of the first selected data segment and the second selected thread occurs at the same time. Additionally, the processing of the selected data segment may include extracting bits from the selected data segment, converting the bits to engineering units, and determining if the bits are within a safety range.

Technical advantages of particular embodiments of the present disclosure include a system and method for simultaneously processing a plurality of telemetry data segments in a software environment. Software utilized for processing telemetry data are much more versatile and less expensive to maintain than hardware units utilized for processing telemetry data. The simultaneous processing of a plurality of telemetry data segments allows the telemetry engine to provide a faster response time to a satellite transmitting telemetry data at high data rates. Thus, response time to a satellite may be dramatically reduced by simultaneously processing a plurality of telemetry data segments.

Other technical advantages of the present disclosure will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present disclosure and its features and advantages, reference is now made to the following description, taken in conjunction with the accompanying drawings, in which:

FIG. 1A is a block diagram illustrating a system for simultaneously processing telemetry data according to the teachings of the disclosure;

FIG. 1B is a block diagram illustrating an example of telemetry data in accordance with an embodiment of the disclosure;

FIG. 3 is a flow chart illustrating an example method for simultaneously processing telemetry data in accordance with an embodiment of the disclosure.

DESCRIPTION OF EXAMPLE EMBODIMENTS

Figure 2:
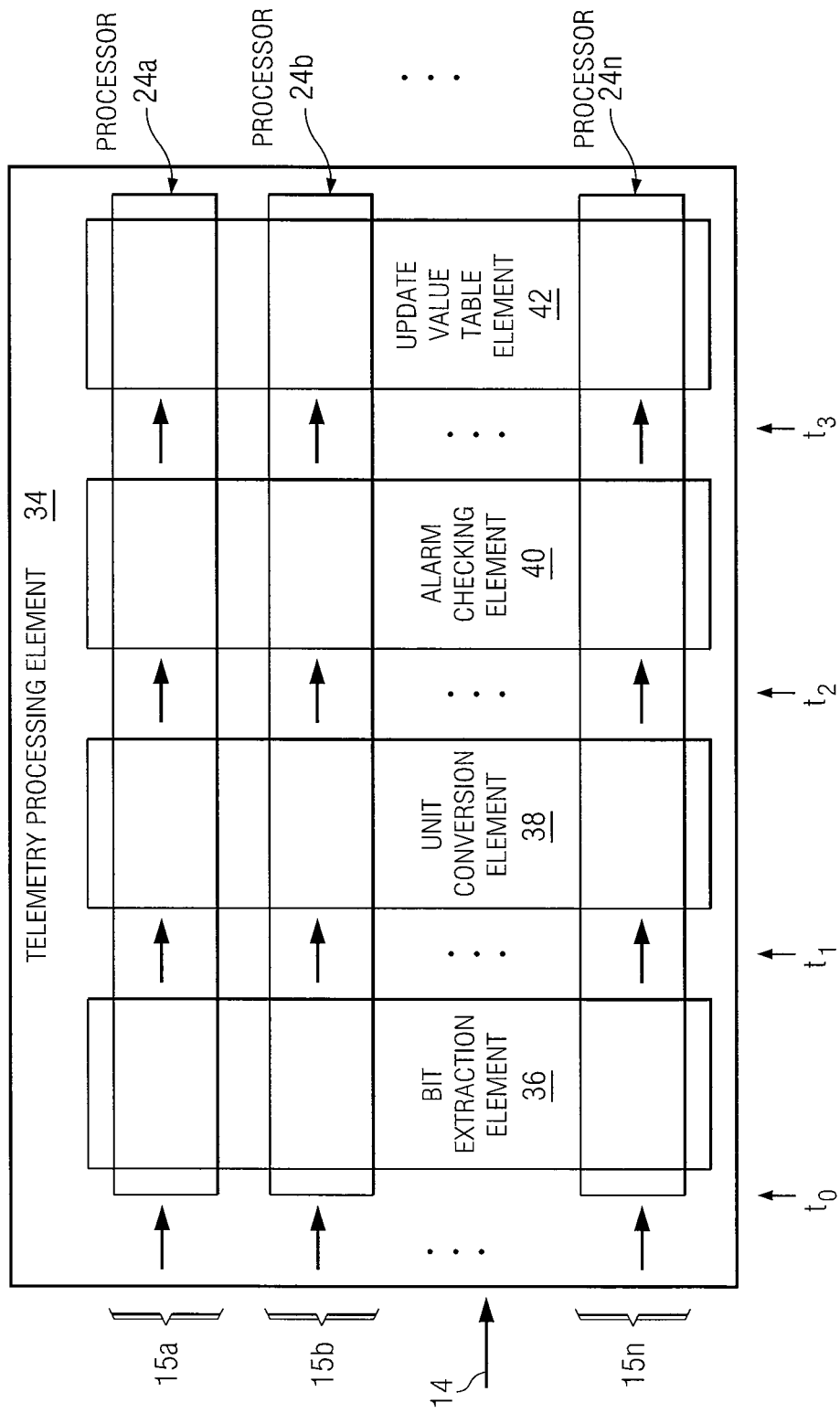
FIG. 2 is a block diagram illustrating an example method for simultaneously processing telemetry data in accordance with an embodiment of the disclosure.

Embodiments of the present disclosure and its advantages are best understood by referring to FIGS. 1 through 3 of the drawings, like numerals being used for like and corresponding parts of the various drawings.

FIG. 1A is a block diagram illustrating a system for simultaneously processing telemetry data according to the teachings of the disclosure. As shown in FIG. 1A, system 10 generally includes a satellite 12, telemetry data 14, a communication network 16, and a telemetry server 20. Telemetry server 20 may include multiple processors 24, a memory 26, a communication interface 28, an input device 30, an output device 32, and a telemetry processing element 34.

In accordance with certain embodiments, telemetry server 20 may simultaneously process a plurality of telemetry data segments. Simultaneously processing a plurality of telemetry data segments may be advantageous for timely providing useful data to satellite 12. In particular, because satellite 12 may transmit telemetry data 14 at very high data rates, telemetry server 20 may provide useful data to satellite 12 more quickly by simultaneously processing a plurality of telemetry data segments. Each data segment may be processed simultaneously, such that telemetry processing for each data segment can occur in parallel. For example, telemetry processes for each telemetry data segment may each be processed separately by a particular thread. The telemetry processes may include extracting bits from the selected data segment, converting the bits to engineering units, and determining if the bits are within a safety range. After quickly and efficiently processing the plurality of telemetry data segments, telemetry server 20 may quickly take some action in response to the processed telemetry data 14. Telemetry server 20 may need to respond to a condition associated with satellite 12 if the processed telemetry data indicates there is a problem. The faster that telemetry server 20 can process telemetry data 14 from satellite 12, then the faster that telemetry server 20 can respond to a condition associated with satellite 12. The subsequent disclosure will provide greater detail regarding the functionality of telemetry server 20.

Satellite 12 may represent any suitable combination of hardware, software, and controlling logic operable to measure telemetry data 14 and communicate with telemetry server 20. Satellite 12 may be an unmanned aerial vehicle, missile, spacecraft, surveillance aircraft, earth orbiting device, or other vehicle or device. In operation, satellite 12 may receive commands from telemetry server 20 and perform operations in response to the received commands. Satellite 12 may measure any type of telemetry data 14 and transmit telemetry data 14 to telemetry server 20 for processing.

Telemetry data 14 may represent any type of data associated with satellite. Telemetry data may indicate the health of satellite, location of satellite, direction of satellite, temperature of satellite, speed of satellite, details associated with the payload transported by satellite, etcetera. Telemetry data 14 may include one or more raw bits. Telemetry data 14 may be transmitted in the form of packets, cells, frames, or any other suitable package for transporting telemetry data 14 to be received and processed by telemetry server 20. In one particular embodiment, telemetry data 14 may be transported in a packetized form, such as a Consultative Committee for Space Data Systems (CCDSDS) packet. In one particular embodiment, telemetry data 14 may be transported in a fix frame form, such that fix frame form is made up of one or more minor frames. Telemetry data 14 may include one or more telemetry data segments. Telemetry data segment 15 may be any suitable portion of telemetry data that can be received and processed by telemetry server. Telemetry data segment may represent a packet, cell, a major frame, a minor frame, a word, etcetera.

Communication network 16 provides connectivity between components coupled to communication network 16 using any appropriate communication protocol. In general, communication network 16 may represent any combination of public or private communication equipment such as elements of a public switched telephone network (PSTN), a global computer network such as the Internet, a local area network (LAN), a wide-area network (WAN), or other appropriate communication equipment. Communication network 16 may include any hardware and/or software configured to communicate information in the form of packets, cells, frames, segments or other portions of data. Communication network 16 may also include routers, hubs, switches, gateways, call controllers, and/or any other suitable components in any suitable form or arrangement. Although communication network 16 is illustrated as a single network, communication network 16 may comprise any number or configuration of networks. Moreover, certain embodiments of system 10 may include any number or configuration of communication networks 16.

Telemetry server 20 may represent any suitable combination of hardware, software, and controlling logic operable to receive telemetry data 14, process telemetry data 14, and transmit commands to satellite 12 in response to processed telemetry data. Telemetry server may contain one or more processors 24a, 24b, and 24n. According to a particular embodiment of the disclosure, telemetry server may simultaneously process a plurality of telemetry data segments, such that one particular processor 24a may process one particular telemetry data segment 15a and another particular processor 24b may process another particular telemetry data segment 15b. Telemetry processing element 34, described below in more detail, processes telemetry data 14.

Processor 24 (either 24a, 24b, or 24n) may refer to any suitable device operable to execute instructions and manipulate data to perform operations for telemetry server 20. Processor 24 may include, for example, any type of central processing unit (CPU). Processor 24 may include, for example, one or more threads for performing telemetry processing for a telemetry data segment.

Memory device 26 may refer to any suitable device operable to store and facilitate retrieval of data. Memory device 26 may comprise Random Access Memory (RAM), Read Only Memory (ROM), a magnetic drive, a disk drive, a Compact Disk (CD) drive, a Digital Video Disk (DVD) drive, removable media storage, any other suitable data storage medium, or a combination of any of the preceding. Memory device 26 may store results of the processed telemetry data.

Communication interface 28 may refer to any suitable device operable to receive input for telemetry server 20, send output from telemetry server 20, perform suitable processing of the input or output or both, communicate to other devices, or any combination of the preceding. Communication interface 28 may include appropriate hardware (e.g. modem, network interface card, etc.) and software, including protocol conversion and data processing capabilities, to communicate through a LAN, WAN, or other communication system that allows telemetry server 20 to communicate to other devices, such as satellite 12. Communication interface 28 may include one or more ports, conversion software, or both.

Input device 30 may refer to any suitable device operable to input, select, and/or manipulate various data and information. Input device 30 may include, for example, a keyboard, mouse, graphics tablet, joystick, light pen, microphone, scanner, or other suitable input device.

Output device 32 may refer to any suitable device operable for displaying information to a user. Output device 32 may include, for example, a video display, a printer, a plotter, or other suitable output device.

Decommutation table 33 may include one or more instructions for extracting bits from a data segment 15 and associating the extracted bits with a particular telemetry mnemonic type. A telemetry mnemonic may represent any type of telemetry data. For example, telemetry mnemonic types may include a satellite health mnemonic, location mnemonic, direction mnemonic, temperature mnemonic, speed mnemonic, etcetera. In one particular embodiment, decommutation table may contain over 1,000 different types of telemetry mnemonics. Decommutation table may use values associated with a particular data segment to determine the bits to extract from data segment 15 and the telemetry mnemonic type to associate with the extracted bits. The values associated with data segment 15 that are utilized by decommutation table to perform the above mentioned processes may include the mode, frame id, byte, bit, etcetera. Some of these values associated with data segment 15 may be determined during the preprocessing of a data segment 15 as explained below in more detail.

Telemetry processing element 34 may refer to any suitable logic embodied in computer-readable media, and when executed, that is operable to receive telemetry data 14 and perform various steps of processing to telemetry data segment 15. Telemetry processing element 34 may perform parallel processing, such that multiple data segments 15 are processed simultaneously. Each process may be executed on a separate thread associated with a particular processor 26.

It is important to note that telemetry server 20 and telemetry processing element 34 may include any suitable elements, hardware, software, objects, or components capable of effectuating their operations or additional operations where appropriate. Additionally, any one or more of the elements included in telemetry server 20 and telemetry processing element 34 may be provided in an external structure or combined into a single module or device where appropriate. Moreover, any of the functions provided by these two elements may be offered in a single unit or single functionalities may be arbitrarily swapped between telemetry server 20 and telemetry processing element 34. The embodiment offered in FIG. 1A has been provided for purposes of example only. The arrangement of elements (and their associated operation(s)) may be reconfigured significantly in any other appropriate manner in accordance with the teachings of the present disclosure.

Telemetry processing element 34 may perform various steps of preprocessing to telemetry data segment 15, such as quality checking, data segment mode identification (for example, normal, dwell, or dump), data segment format identification, and data segment number identification (for example, a data segment number). The various steps of preprocessing may occur for any type of data segment 15. In one particular embodiment utilizing fix frame form as data segment 15, the various steps of preprocessing the telemetry data segment 15, such as the fix frame, may include quality checking, frame mode identification, frame format identification, and frame number identification (for example, a minor frame number). In one particular embodiment, preprocessing of each data segment 15 may be performed simultaneously by a plurality of processors 24.

After the preprocessing is complete, telemetry processing element 34 may extract the raw bits of multiple data segments 15 and associate these raw bits with a telemetry mnemonic type, such that these processes are occurring simultaneously for multiple data segments 15. In one particular embodiment, telemetry processing element 34 may utilize one processor 24a to extract the raw bits from one data segment 15a and associate these extracted bits with a telemetry mnemonic type. Telemetry processing element 34 may also utilize another processor 24b to extract the raw bits from another data segment 15b and associate these extracted bits with a telemetry mnemonic type, such that the bit extraction and the mnemonic type association for data segment 15a and data segment 15b are occurring in parallel. This same technique can be extended out such that telemetry server 20 with 1,000 processors could utilize telemetry processing element 34 to perform 1,000 different bit extractions and mnemonic type associations simultaneously. In one particular embodiment, decommutation table 33 may be utilized to determine the bits to extract from data segment 15 and the telemetry mnemonic type to associate with the extracted bits.

After the extracted bits are associated with a telemetry mnemonic type, telemetry processing element 34 may perform engineering unit conversions to the extracted bits, such that the engineering unit conversion processes are occurring simultaneously for multiple extracted bits. In one particular embodiment, telemetry processing element 34 may utilize one processor 24a to perform engineering unit conversions to extracted bits originating from data segment 15a. Telemetry processing element 34 may also utilize another processor 24b to perform engineering unit conversions to extracted bits originating from data segment 15b, such that the engineering unit conversions for the extracted bits originating from data segment 15a and the extracted bits originating from data segment 15b are occurring in parallel. This same technique can be extended out such that a telemetry server 20 with 1,000 processors could utilize telemetry processing element 38 to perform 1,000 different engineering unit conversions simultaneously. Engineering unit conversion may convert the extracted bits to an engineering unit value based on the telemetry mnemonic type. The engineering unit value may represent any suitable value in a telemetry environment, such as temperature, voltage, kilometers per hour, global positioning system location, etcetera. In one particular embodiment, engineering unit conversion may convert the extracted bits "10110110" associated with a temperature mnemonic type to an engineering unit value "68.4" representing a Celsius temperature. Engineering unit value may be any suitable value type recognized by telemetry server 20. In one particular embodiment, engineering unit value may be a 1750A float, an IEEE float, an integer, a double, etcetera.

After the extracted bits are converted to an engineering unit value, telemetry processing element 34 may perform alarm checking to the engineering unit value, such that the alarm checking processes are occurring simultaneously for multiple engineering unit values. In one particular embodiment, telemetry processing element 34 may utilize one processor 24a to perform alarm checking to engineering unit value originating from data segment 15a. Telemetry processing element 34 may also utilize another processor 24b to perform alarm checking to engineering unit value originating from data segment 15b, such that the alarm checking to the engineering unit value originating from data segment 15a and the engineering unit value originating from data segment 15b are occurring in parallel. This same technique can be extended out such that a telemetry server 20 with 1,000 processors could utilize telemetry processing element 38 to perform 1,000 different alarm checking processes simultaneously. Alarm checking process may check if engineering unit associated with a telemetry mnemonic type is within the proper safety limits. The result of the alarm checking may be an alarm value representing if an alarm should or should not be sent.

After the engineering unit value has been processed by the alarm checking process, telemetry processing element 34 may perform various other telemetry processing, such that these various other telemetry processes are occurring simultaneously in parallel. Other telemetry processes may include any suitable process associated with telemetry data 14, such as storing all updated values associated with the processed data segments.

Telemetry server 20 may perform one or more actions based on the processed data segments. In one particular embodiment, telemetry server 20 may input all updated values returned by the processed data segments into an algorithm for testing the overall health of satellite 12. In one particular embodiment, telemetry server 20 may transmit a signal to satellite 12 to effect a change of satellite 12, such as changing direction, slowing down, shutting down a component, etcetera.

It is important for the operations of the telemetry server and satellite to quickly perform an action based on the received telemetry data. The simultaneous processing of data segments 15 performed by telemetry processing element 34 allows telemetry server 20 to respond faster to received telemetry data 14. As a result, telemetry server 20 has a greater probability of effectively responding to a negative condition of satellite 12.

FIG. 1B is a block diagram illustrating an example of telemetry data in accordance with an embodiment of the disclosure. Telemetry data 14 may represent any type of data associated with satellite 12. Telemetry data 14 may indicate the health of satellite, location of satellite, direction of satellite, temperature of satellite, speed of satellite, details associated with the payload transported by satellite, etcetera. Telemetry data 14 may include one or more raw bits. Telemetry data 14 may be transmitted in the form of packets, cells, frames, or any other suitable package for transporting telemetry data 14 to be received and processed by telemetry server 20. In one particular embodiment, telemetry data 14 may be transported in a packetized form, such as a CCDSDS packet. In one particular embodiment, telemetry data 14 may be transported in a fix frame form, such that fix frame form is made up of one or more minor frames.

Telemetry data 14 may include one or more telemetry data segments 15 (either 15a, 15b, or 15n). Telemetry data segment 15 may be any suitable portion of telemetry data that can be received and processed by telemetry server 20. Telemetry data segment 15 may represent a packet, cell, a major frame, a minor frame, a byte, a word, etcetera.

FIG. 2 is a block diagram illustrating an example method for simultaneously processing telemetry data in accordance with an embodiment of the disclosure. As shown in FIG. 2, telemetry processing element 34 generally utilizes telemetry data 14 comprising data segments 15 (15a, 15b, or 15n), processors 24 (24a, 24b, or 24n), bit extraction element 36, unit conversion element 38, alarm checking element 40, and update value table element 42. Although four telemetry data processes are displayed in the elements 36, 38, 40, and 42, the present disclosure contemplates using various other telemetry processes. Various embodiments may include some, all, or none of the identified telemetry data processes identified in the elements 36, 38, 40, and 42.

According to one embodiment of the disclosure, telemetry processing element 34 may perform parallel processing, such that multiple data segments are processed simultaneously. Each process may be executed on a separate thread associated with a particular processor 26.

Telemetry processing element 34 may perform various steps of preprocessing to telemetry data segment 15, such as quality checking, data segment mode identification (for example, normal, dwell, or dump), data segment format identification, and data segment number identification (for example, a data segment number). The various steps of preprocessing may occur for any type of data segment 15. In one particular embodiment utilizing fix frame form as data segment 15, the various steps of preprocessing the telemetry data segment 15, such as the fix frame, may include quality checking, frame mode identification, frame format identification, and frame number identification (for example, a minor frame number). In one particular embodiment, preprocessing of each data segment 15 may be performed simultaneously by a plurality of processors 24.

Bit extraction element 36 may refer to any suitable logic embodied in computer-readable media, and when executed, that is operable to receive telemetry data segment 15. Bit extraction element 36, when executed, may be operable to utilize decommutation table 33 to determine the bits to extracted from data segment 15 and the telemetry mnemonic type to associate with the extracted bits. Telemetry processing element 34 may extract the raw bits of multiple data segments 15 and associate these raw bits with a telemetry mnemonic type at time t0, such that these processes are occurring simultaneously for multiple data segments 15. In one particular embodiment, telemetry processing element 34 may utilize one processor 24a to extract the raw bits from one data segment 15a and associate these extracted bits with a telemetry mnemonic type. Telemetry processing element 34 may also utilize another processor 24b to extract the raw bits from another data segment 15b and associate these extracted bits with a telemetry mnemonic type, such that the bit extraction and the mnemonic type association for data segment 15a and data segment 15b are occurring in parallel. This same technique can be extended out such that telemetry server 20 with 1,000 processors could utilize telemetry processing element 34 to perform 1,000 different bit extractions and mnemonic type associations simultaneously.

Unit conversion element 38 may refer to any suitable logic embodied in computer-readable media, and when executed, that is operable to receive extracted bits associated with a telemetry mnemonic type. Unit conversion element 38, when executed, may be operable to perform engineering unit conversions to the extracted bits. Engineering unit conversion may convert the extracted bits to an engineering unit value based on the telemetry mnemonic type. After the extracted bits are associated with a telemetry mnemonic type, telemetry processing element 34 may perform engineering unit conversions to the extracted bits at time t1, such that the engineering unit conversion processes are occurring simultaneously for multiple extracted bits. In one particular embodiment, telemetry processing element 34 may utilize one processor 24a to perform engineering unit conversions to extracted bits originating from data segment 15a. Telemetry processing element 34 may also utilize another processor 24b to perform engineering unit conversions to extracted bits originating from data segment 15b, such that the engineering unit conversions for the extracted bits originating from data segment 15a and the extracted bits originating from data segment 15b are occurring in parallel. This same technique can be extended out such that a telemetry server 20 with 1,000 processors could utilize telemetry processing element 38 to perform 1,000 different engineering unit conversions simultaneously.

Alarm checking element 40 may refer to any suitable logic embodied in computer-readable media, and when executed, that is operable to receive an engineering unit value. Alarm checking element 40, when executed, may be operable to perform alarm checking to the engineering unit value. Alarm checking process may check if engineering unit value associated with a telemetry mnemonic type is within the proper safety limits, and associate an alarm value to the originating data segment. After the extracted bits are converted to an engineering unit value, telemetry processing element 34 may perform alarm checking to the engineering unit value at time t2, such that the alarm checking processes are occurring simultaneously for multiple engineering unit values. In one particular embodiment, telemetry processing element 34 may utilize one processor 24a to perform alarm checking to engineering unit value originating from data segment 15a. Telemetry processing element 34 may also utilize another processor 24b to perform alarm checking to engineering unit value originating from data segment 15b, such that the alarm checking to the engineering unit value originating from data segment 15a and the engineering unit value originating from data segment 15b are occurring in parallel. This same technique can be extended out such that a telemetry server 20 with 1,000 processors could utilize telemetry processing element 38 to perform 1,000 different alarm checking processes simultaneously.

Update value table element 42 may refer to any suitable logic embodied in computer-readable media, and when executed, that is operable to update the values associated with satellite 12. After the engineering unit value has been processed by the alarm checking process, telemetry processing element 34 may update the values associated with the originating data segment at time t3, such that the update value table processes are occurring simultaneously for multiple data segments 15. In one particular embodiment, telemetry processing element 34 may utilize one processor 24a to update the values associated with the originating data segment 15a. Telemetry processing element 34 may also utilize another processor 24b to update the values associated with the originating data segment 15b, such that updating the values associated with the originating from data segment 15a and the originating data segment 15b are occurring in parallel. This same technique can be extended out such that a telemetry server 20 with 1,000 processors could utilize telemetry processing element 38 to perform 1,000 different updates of 1,000 originating data segments processes simultaneously.

After the update value table process has been processed, telemetry server 20 may perform one or more actions based on the updated values. In one particular embodiment, telemetry server 20 may input all updated values returned by the processed data segments into an algorithm for testing the overall health of satellite 12. In one particular embodiment, telemetry server 20 may transmit a signal to satellite 12, in response to an updated value, to effect a change of satellite 12, such as changing direction, slowing down, shutting down a component, etcetera.

FIG. 3 is a flow chart illustrating an example method for simultaneously processing telemetry data in accordance with an embodiment of the disclosure. The example acts may be performed by telemetry processing element 34, as discussed above with reference to FIG. 1A, or by any other suitable device. At step 302, telemetry processing element 34 may receive telemetry data 14 from satellite 12 that includes one or more data segments. Telemetry processing element may perform various steps of preprocessing to telemetry data segment 15, such as quality checking, data segment mode identification (for example, normal, dwell, or dump), data segment format identification, and data segment number identification (for example, a data segment number). The various steps of preprocessing may occur for any type of data segment 15. In one particular embodiment utilizing fix frame form as data segment 15, the various steps of preprocessing the telemetry data segment 15, such as the fix frame, may include quality checking, frame mode identification, frame format identification, and frame number identification (for example, a minor frame number). In one particular embodiment, preprocessing of each data segment 15 may be performed simultaneously by a plurality of processors 24.

At step 304, after receiving the plurality of telemetry data segments and preprocessing the data segments, telemetry processing element 34 may extract the raw bits of multiple data segments 15 and associate these raw bits with a telemetry mnemonic type, such that these processes are occurring simultaneously for multiple data segments 15. In one particular embodiment, telemetry processing element 34 may utilize one processor 24a to extract the raw bits from one data segment 15a and associate these extracted bits with a telemetry mnemonic type. Telemetry processing element 34 may also utilize another processor 24b to extract the raw bits from another data segment 15b and associate these extracted bits with a telemetry mnemonic type, such that the bit extraction and the mnemonic type association for data segment 15a and data segment 15b are occurring in parallel. This same technique can be extended out such that telemetry server 20 with 1,000 processors could utilize telemetry processing element 34 to perform 1,000 different bit extractions and mnemonic type associations simultaneously. In one particular embodiment, decommutation table 33 may be utilized to determine the bits to extract from data segment 15 and the telemetry mnemonic type to associate with the extracted bits.

At step 306, after the extracted bits are associated with a telemetry mnemonic type, telemetry processing element 34 may perform engineering unit conversions to the extracted bits, such that the engineering unit conversion processes are occurring simultaneously for multiple extracted bits. In one particular embodiment, telemetry processing element 34 may utilize one processor 24a to perform engineering unit conversions to extracted bits originating from data segment 15a. Telemetry processing element 34 may also utilize another processor 24b to perform engineering unit conversions to extracted bits originating from data segment 15b, such that the engineering unit conversions for the extracted bits originating from data segment 15a and the extracted bits originating from data segment 15b are occurring in parallel. This same technique can be extended out such that a telemetry server 20 with 1,000 processors could utilize telemetry processing element 38 to perform 1,000 different engineering unit conversions simultaneously. Engineering unit conversion may convert the extracted bits to an engineering unit value based on the telemetry mnemonic type. The engineering unit value may represent any suitable value in a telemetry environment, such as temperature, voltage, kilometers per hour, global positioning system location, etcetera. In one particular embodiment, engineering unit conversion may convert the extracted bits "10110110" associated with a temperature mnemonic type to an engineering unit value "68.4" representing a Celsius temperature. Engineering unit value may be any suitable value type recognized by telemetry server 20. In one particular embodiment, engineering unit value may be a 1750A float, an IEEE float, an integer, a double, etcetera.

At step 308, after the extracted bits are converted to an engineering unit value, telemetry processing element 34 may perform alarm checking to the engineering unit value, such that the alarm checking processes are occurring simultaneously for multiple engineering unit values. In one particular embodiment, telemetry processing element 34 may utilize one processor 24a to perform alarm checking to engineering unit value originating from data segment 15a. Telemetry processing element 34 may also utilize another processor 24b to perform alarm checking to engineering unit value originating from data segment 15b, such that the alarm checking to the engineering unit value originating from data segment 15a and the engineering unit value originating from data segment 15b are occurring in parallel. This same technique can be extended out such that a telemetry server 20 with 1,000 processors could utilize telemetry processing element 38 to perform 1,000 different alarm checking processes simultaneously. Alarm checking process may check if engineering unit associated with a telemetry mnemonic type is within the proper safety limits. The result of the alarm checking may be an alarm value representing if an alarm should or should not be sent.

At step 310, after the engineering unit value has been processed by the alarm checking process, telemetry server 20 may perform one or more actions based on the processed data segments. Telemetry server 20 may transmit a signal to satellite 12 to effect a change of satellite 12, such as changing direction, slowing down, shutting down a component, etcetera.

Some of the steps illustrated in FIG. 3 may be changed or deleted where appropriate and additional steps may also be added to the flowcharts. These changes may be based on specific communication architectures or particular interfacing arrangements and configurations of associated elements and do not depart from the scope or the teachings of the present disclosure. The interactions and operations of the elements within satellite 12, telemetry server 20, and telemetry processing element 34 as disclosed in FIG. 3, have provided merely one example for their potential applications. Numerous other applications may be equally beneficial and selected based on particular needs.

Although the present disclosure has been described in several embodiments, a myriad of changes, variations, alterations, transformations, and modifications may be suggested to one skilled in the art, and it is intended that the present disclosure encompass such changes, variations, alterations, transformations, and modifications as falling within the spirit and scope of the appended claims.

What is claimed is:
1. A method for use in telemetry processing, comprising:
receiving, by a telemetry processor having one or more processors, a telemetry data package originating from a satellite, wherein the telemetry data package comprises a plurality of data segments from the satellite;

simultaneously processing the plurality of data segments of the telemetry data package form the satellite; and transmitting a signal to the satellite, in response to the processing, for effecting a change in the direction of the satellite.

2. The method of claim 1, wherein processing the plurality of data segments simultaneously comprises:
processing a first selected data segment on a first selected thread from a plurality of threads; and
processing a second selected data segment on a second selected thread, wherein the processing of the first selected data segment and the second selected thread occurs at the same time.

3. The method of claim 2, wherein the first selected thread is executed on a first selected processor from a plurality of processors and the second selected thread is executed on a second selected processor.

4. The method of claim 1, wherein a selected data segment is associated with a telemetry mnemonic.

5. The method of claim 1, wherein telemetry data comprises bits in a packetized form.

6. A method for use in telemetry processing, comprising:
receiving, by a telemetry processor having one or more processors, telemetry data originating from a satellite, wherein the telemetry data comprises a plurality of data segments;
processing the plurality of data segments simultaneously; and
transmitting a signal to the satellite, in response to the processing, for effecting a change in the direction of the satellite,
wherein the processing of a selected data segment comprises:
extracting bits from the selected data segment;
converting the bits to an engineering unit value; and
determining if the engineering unit value is within a safety range.

7. An apparatus for use in telemetry processing, comprising:
a plurality of processors; and
a telemetry processing element operable to:
receive a telemetry data package originating from a satellite, wherein the telemetry data package comprises a plurality of data segments from the satellite; and
simultaneously process the plurality of data segments of the telemetry data package from the satellite.

8. The apparatus of claim 7, wherein the telemetry processing element is further operable to perform at least one of the following:
store processed telemetry data;
transmit a signal to the satellite in response to the processed telemetry data for effecting a change in the direction of the satellite; and
transmit a signal to the satellite in response to the processed telemetry data for effecting a change in the speed of the satellite.

9. The apparatus of claim 7, wherein processing the plurality of data segments simultaneously comprises:
processing a first selected data segment on a first selected thread from a plurality of threads; and
processing a second selected data segment on a second selected thread, wherein the processing of the first selected data segment and the second selected thread occurs at the same time.

10. The apparatus of claim 9, wherein the first selected thread is executed on a first selected processor and the second selected thread is executed on a second selected processor.

11. The apparatus of claim 7, wherein the processing of a selected data segment comprises:
extracting bits from the selected data segment;
converting the bits to an engineering unit value; and
determining if the engineering unit value is within a safety range.

12. The apparatus of claim 7, wherein a selected data segment is associated with a telemetry mnemonic.

13. The apparatus of claim 7, wherein telemetry data comprises bits in a packetized form.

14. One or more computer-readable non-transitory storage media embodying software that is operable, when executed by a processor, to:
receive, for telemetry processing, a telemetry data package originating from a satellite, wherein the telemetry data package comprises a plurality of data segments from the satellite; and
simultaneously process the plurality of data segments of the telemetry data package from the satellite.

15. The media of claim 14, wherein the software is further operable to perform at least one of the following:
store processed telemetry data; and
transmit a signal to the satellite in response to the processed telemetry data for effecting a change in the direction of the satellite; and
transmit a signal to the satellite in response to the processed telemetry data for effecting a change in the speed of the satellite.

16. The media of claim 14, wherein processing the plurality of data segments simultaneously comprises:
processing a first selected data segment on a first selected thread from a plurality of threads; and
processing a second selected data segment on a second selected thread, wherein the processing of the first selected data segment and the second selected thread occurs at the same time.

17. The media of claim 16, wherein the first selected thread is executed on a first selected processor from a plurality of processors and the second selected thread is executed on a second selected processor.

18. The media of claim 14, wherein the processing of a selected data segment comprises:
extracting bits from the selected data segment;
converting the bits to an engineering unit value; and
determining if the engineering unit value is within a safety range.

19. The media of claim 14, wherein a selected data segment is associated with a telemetry mnemonic.

20. The media of claim 14, wherein telemetry data comprises bits in a packetized form.

* * * * *